Figure 1:
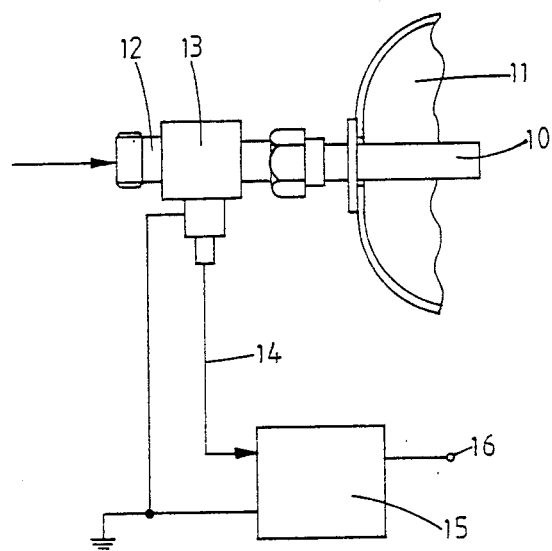

United States Patent [19]

Skerritt

[11] Patent Number: 4,760,341
[45] Date of Patent: Jul. 26, 1988

[54] METHOD AND APPARATUS FOR MONITORING OPERATION OF A SPARK IGNITION DEVICE IN A GAS TURBINE ENGINE

[75] Inventor: Robert C. Skerritt, Nuneaton, England

[73] Assignee: Lucas Industries Public Limited Company, Birmingham

[21] Appl. No.: 924,321

[22] Filed: Oct. 29, 1986

[30] Foreign Application Priority Data

Nov. 27, 1985 [GB] United Kingdom ............... 8529223

[51] Int. Cl.⁴ ............................................. F02P 17/00
[52] U.S. Cl. ...................................... 324/379; 73/116
[58] Field of Search ............... 324/399, 379, 378, 383; 73/116

[56] References Cited

U.S. PATENT DOCUMENTS

| | | | |
|---|---|---|---|
| 3,409,824 | 11/1968 | Makuh | 324/379 |
| 3,551,800 | 12/1970 | Widmer | 324/383 |
| 3,942,102 | 3/1976 | Kuhn | 324/399 |
| 4,449,100 | 5/1984 | Johnson | 324/399 |

FOREIGN PATENT DOCUMENTS 2343895  3/1975  Fed. Rep. of Germany ...... 324/399

*Primary Examiner*—Reinhard J. Eisenzopf
*Assistant Examiner*—Jose M. Solis
*Attorney, Agent, or Firm*—Nixon & Vanderhye

[57] ABSTRACT

The characteristics of an energizing voltage pulse and of the spark discharge in an ignition device for a gas turbine engine are monitored by providing a voltage whose magnitude and duration correspond to those of an electrical field in the ignition device. An output signal is provided only when the duration and magnitude of the energizing pulse are respectively not greater than and not less than predetermined values, and when the time integral over a preset period of spark discharges in the device is greater than a predetermined value.

6 Claims, 3 Drawing Sheets

METHOD AND APPARATUS FOR MONITORING OPERATION OF A SPARK IGNITION DEVICE IN A GAS TURBINE ENGINE

This invention relates to an apparatus and method for monitoring operation of spark ignition devices in gas turbine engines. During starting gas turbine engines are commonly ignited by a spark device which is energised by a relatively high voltage from a supply unit. It is required to monitor the spark device for faulty operation. EP-A-0125820 discloses an arrangement which acoustically detects actual spark discharge of an ignition device. Preferably, however, such monitoring should additionally detect incipient failure of the device. The present invention makes use of the fact that persistence for more than a predetermined time of an energising pulse for the spark discharge is indicative of deterioration of the discharge device. The present invention therefore provides an indicating signal if this duration does not exceed a selected value.

According to the invention a method of monitoring operation of a spark ignition device in a gas turbine engine comprises detecting the magnitude and duration of an electric field in said device and generating a first indicating signal if the duration of a voltage pulse applied to said device does not exceed a predetermined value.

The invention also resides in an apparatus for monitoring operation of a spark ignition device in a gas turbine engine, comprising means for detecting the magnitude and duration of an electric field in said device and means for generating a first indicating signal if the duration of a voltage pulse applied to said device does not exceed a predetermined value.

Figure 4:
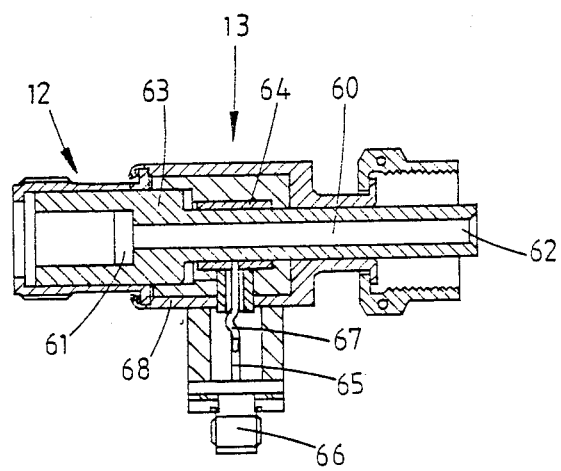
Figure 2:
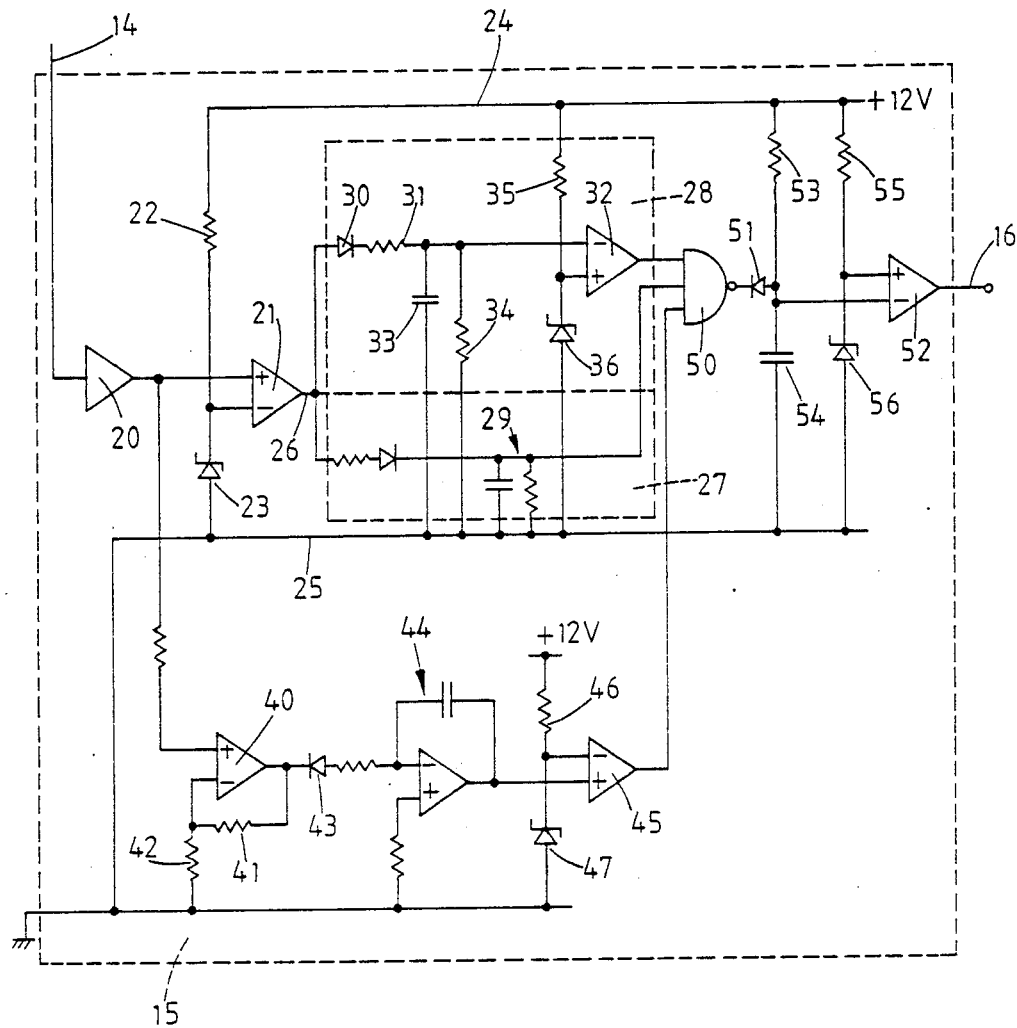
Figure 3:
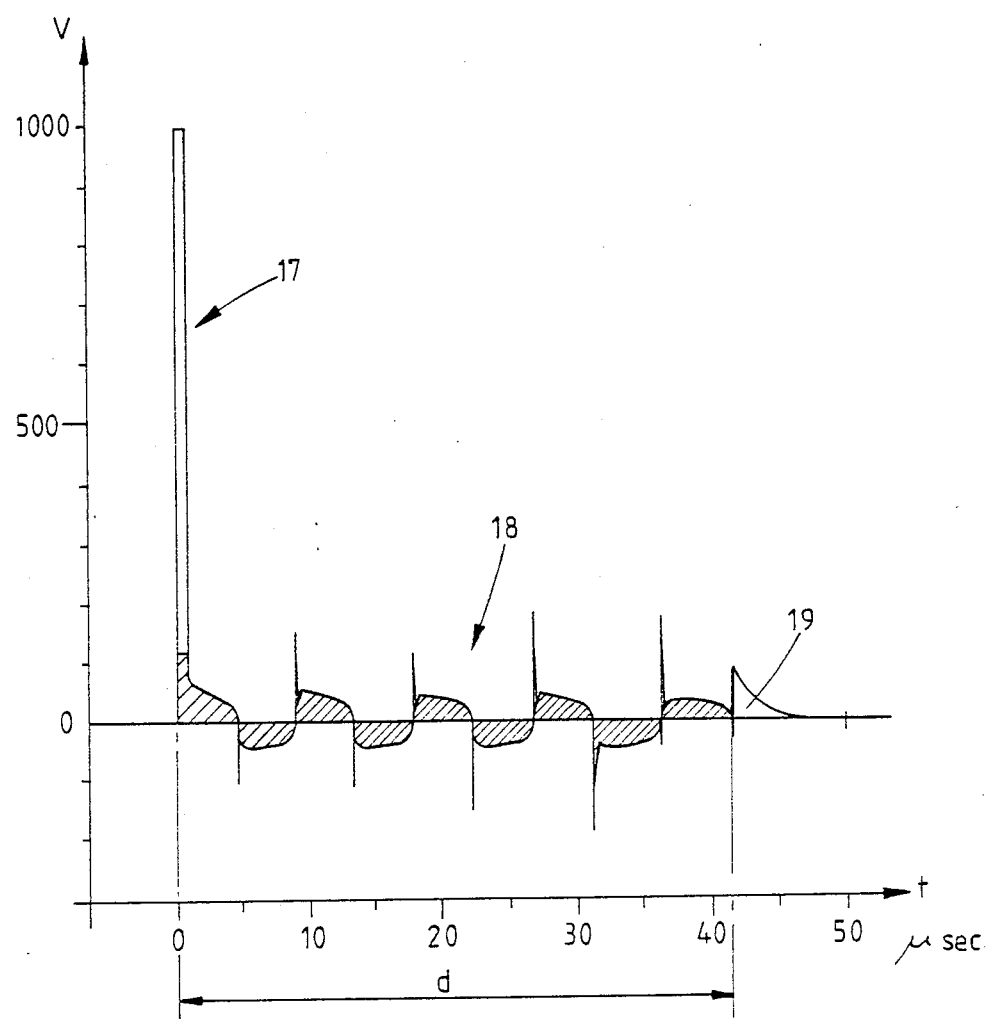

An embodiment of the invention will now be described by way of example only and with reference to the accompanying drawings in which:

FIG. 1 is a diagram of a spark discharge device located in a gas turbine engine combustion chamber, FIG. 2 is diagram of a circuit for monitoring operation of the discharge device in FIG. 1, FIG. 3 is a graph showing variation with time of typical voltages at the spark discharge device, and FIG. 4 is section, to an enlarged scale, through a detector device for providing voltage signals to the circuit of FIG. 2.

As shown in FIG. 1 a spark discharge device 10 is mounted so as to extend within a combustion chamber 11 of a gas turbine engine and has a connector 12 to which an energising voltage is applied, in use, from an external source (not shown). Surrounding the connector 12 is a detector 13 which is shown in more detail in FIG. 4 and which provides, on a line 14 a voltage whose magnitude and duration correspond to those of an electrical field in the spark discharge device 10. The voltage on line 14 is applied to a monitoring circuit 15 which, in a manner to be described, supplies an output signal to a terminal 16 if the voltages on the line 14 fall within acceptable values.

As indicated in FIG. 3 a voltage of the order of 1 kV is applied to the connector 12 and results in spark discharge at the tip of the device 10. The duration of the 1 kV voltage pulse 17 is typically 0.5 microseconds and the duration of the spark discharge 18 thereafter is typically 41 microseconds. The circuit 15 establishes that the magnitude and duration of the pulse 17 are within acceptable limits and that the time integral of the negative-going portions of the waveform 18 of the spark discharge has an acceptable value, that is a required product of duration and amplitudes.

As shown in FIG. 2 the circuit 15 includes a unity-gain amplifier 20 to which the signal on line 14 is applied. The output of the amplifier 20 is applied to the non-inverting input of a comparator circuit 21. A resistor 22 and a zener diode 23 are connected in series between a +12 volt rail 24 and an earth rail 25, and the junction between the resistor 22 and the diode 23 is connected to the inverting input of the comparator 21 to provide a reference voltage.

If the output signal from the amplifier 20 exceeds the aforesaid reference value the comparator 21 provides an output pulse on a line 26 indicating that the magnitude of the pulse 17 (FIG. 3) is satisfactory.

The signal on line 26 is applied to a timing circuit 27 and to a pulse-width monitoring circuit 28. The circuit 27 is a monostable device having an output signal whose duration is set by a CR arrangement 29 and which is equal to the normal duration d of the discharge waveform 18 (FIG. 3). This output signal is used as a timing signal to ensure that any subsidiary voltage 19 (FIG. 3) is not monitored.

The pulse-width monitoring circuit 28 includes a diode 30 whose anode is connected to the line 26 and a resistor 31 in series between the cathode diode 30 and the inverting input of a comparator 32. A capacitor 33 and a resistor 34 are connected in parallel between the aforesaid inverting input and the earth rail 25. A series arrangement of a resistor 35 and a zener diode 36 is connected between the rails 24, 25 and the junction between the resistor 35 and diode 36 provides a reference voltage at the non-inverting input of the comparator 32.

The circuit 28 is such that the comparator provides a high level output signal unless the capacitor 33 charges sufficiently as to provide an inverting input greater than the reference voltage at the non-inverting input. The rate of charge of the capacitor 33 is dependent on the values of the resistors 31, 34 and these are selected so that the output signal from the comparator 32 remains high unless the duration of the signal on line 26 exceeds a limiting value, for example 2.5 microseconds.

The output signal from the amplifier 20 is also applied to the non-inverting input of an amplifier 40. The inverting input of amplifier 40 is connected to its output through a resistor 41 and to the earth rail 25 through a resistor 42. The ouput signal from the amplifier 40 is applied to the cathode of a diode 43 whose anode is connected to the inverting input of a rectifying integrator circuit 44. The output signal from circuit 44 is applied to the non-inverting input of a comparator circuit 45. The inverting input of comparator circuit 45 is connected to the junction of a resistor 46 and a zener diode 47 connected in series between a +12 volt supply and the earth rail 25. The arrangement is such that the output of the integrator circuit 44 corresponds to the sum of the areas of the negative-going parts of the waveform 18 (FIG. 3) and the comparator 45 provides a high-level output when the integrated value exceeds a reference value set by the resistor 46 and diode 47.

The output signals from circuits 27, 28 and from the comparator 32 are applied to a NAND gate 50 whose output is connected to the cathode of a diode 51. The anode of diode 51 is connected to the inverting input of a comparator circuit 52, to the rail 24 through a resistor 53 and to the earth rail 25 through a capacitor 54. The non-inverting input of the circuit 52 is connected to the junction of a resistor 55 and a zener diode 56 connected in series between the rails 24, 25.

If all inputs to the gate 50 are at high level the resulting low level output causes the capacitor 54 to discharge through the diode 51 and the resulting low level input to the comparator 52 provides a high level output at the terminal 16, this output indicating that the spark discharge device is operating correctly. In the presence of a low level signal at any one of the inputs of the gate 50 the resultant high level signal at its output allows the voltage applied to the comparator 52 to maintain its input at a low level.

As shown in FIG. 4 the connector 12 has a central conductor 60 having two terminals 61, 62 which are in use, respectively connected to a flexible input lead and to a central conductor of the spark discharge device 10. The conductor 60 lies within a cylindrical insulating body 63 and the detector 13 includes a conductive sleeve 64 surrounding the body 63. The sleeve 64 is connected to the central pin 65 of a co-axial connector 66 by means of a wire 67 which passes in an insulated manner through a metal body 68 of the detector 13.

I claim:

1. A method of monitoring operation of a spark ignition device in a gas turbine engine, comprising detecting the magnitude of an electric field in said device, generating a first indicating signal if the duration of an input voltage applied to said device does not exceed a predetermined value, generating a second indicating signal if the magnitude of said input voltage is not less than a predetermined value, and generating an output signal only in the presence of said first and second signals.

2. A method of monitoring operation of a spark ignition device in a gas turbine engine, comprising detecting the magnitude and duration of an electric field in said device, generating a first indicating signal if the duration of an input voltage applied to said device does not exceed a predetermined value, generating a second indicating signal if the magnitude of said input voltage is not less than a predetermined value, generating a third indicating signal if a time integral of a spark discharge in said device is greater than a predetermined value, and generating an output signal only in the presence of said first, second and third indicating signals.

3. An apparatus for monitoring operation of a spark ignition device in a gas turbine engine, comprising means for detecting the magnitude and duration of an electric field in said device, means for generating a first indicating signal if the duration of an input voltage pulse applied to said device does not exceed a predetermined value, means for generating a second indicating signal if the magnitude of said input voltage pulse is not less than a predetermined value, means for generating a third indicating signal if a time integral of a spark discharge in said device is greater than a predetermined value, and means for generating an output signal only in the presence of said first, second and third indicating signals.

4. An apparatus for monitoring operation of a spark ignition device in a gas turbine engine, comprising means for detecting the magnitude and duration of an electric field in said device, means for generating a first indicating signal if the duration of an input voltage pulse applied to said device does not exceed a predetermined value, means for generating a second indicating signal if the magnitude of said input voltage pulse is not less than a predetermined value, and means for generating an output signal only in the presence of said first and second signal.

5. An apparatus as claimed in claim 4 which includes means for generating a third indicating signal if a time integral of the voltage of a series of spark discharges in said device exceeds a predetermined value.

6. An apparatus as claimed in claim 4 in which said means for generating the first indicating signal is responsive to said second indicating signal.

* * * * *